(12) United States Patent
Park et al.

(10) Patent No.: US 8,692,948 B2
(45) Date of Patent: Apr. 8, 2014

(54) ELECTRIC FIELD SHIELDING FOR IN-CELL TOUCH TYPE THIN-FILM-TRANSISTOR LIQUID CRYSTAL DISPLAYS

(75) Inventors: Young-Bae Park, San Jose, CA (US); Ming Xu, Sunnyvale, CA (US); Zhibing Ge, Sunnyvale, CA (US); Cheng Chen, San Jose, CA (US); Shih Chang Chang, San Jose, CA (US); Shawn R. Gettemy, San Jose, CA (US); Joshua G. Wurzel, Sunnyvale, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 12/785,395

(22) Filed: May 21, 2010

(65) Prior Publication Data

US 2011/0285640 A1    Nov. 24, 2011

(51) Int. Cl.
*G02F 1/1333*    (2006.01)

(52) U.S. Cl.
USPC .............................. 349/40; 349/12; 349/96

(58) Field of Classification Search
USPC ........... 349/12, 40, 96, 122, 106, 158, 43, 50, 349/113, 114, 141, 139; 345/173, 174, 211, 345/87; 438/155; 257/E21.7; 361/816, 818
See application file for complete search history.

(56) References Cited

U.S. PATENT DOCUMENTS

| | | | |
|---|---|---|---|
| 6,456,279 B1 | 9/2002 | Kubo et al. | |
| 6,528,572 B1 * | 3/2003 | Patel et al. | 524/495 |
| 7,551,417 B2 * | 6/2009 | Miyata | 361/91.5 |
| 7,663,726 B2 * | 2/2010 | Takahashi et al. | 349/150 |
| 7,843,677 B2 * | 11/2010 | Kang | 361/212 |
| 7,903,204 B2 * | 3/2011 | Son et al. | 349/96 |
| 8,154,675 B2 * | 4/2012 | Imai et al. | 349/40 |
| 8,159,626 B2 * | 4/2012 | Hwang et al. | 349/40 |
| 8,179,374 B2 * | 5/2012 | Jang | 345/173 |
| 8,269,906 B2 * | 9/2012 | Nomura | 349/40 |
| 2004/0135773 A1 | 7/2004 | Bang et al. | |
| 2004/0189587 A1 | 9/2004 | Jung et al. | |
| 2009/0147167 A1 * | 6/2009 | Park | 349/40 |
| 2010/0066650 A1 | 3/2010 | Lee et al. | |
| 2010/0171908 A1 * | 7/2010 | Yoshihara | 349/96 |

* cited by examiner

*Primary Examiner* — Thoi Duong
(74) *Attorney, Agent, or Firm* — Treyz Law Group; G. Victor Treyz; Kendall P. Woodruff

(57) ABSTRACT

Displays such as liquid crystal displays may be used in electronic devices. During operation of a display, electrostatic charges on the surface of the display may give rise to electric fields. One or more electric field shielding layers may be provided in the display to prevent the electric fields from disrupting operation of the liquid crystals material in the display. The shielding layers may be formed at a location in the stack of layers that make up the display that is above the liquid crystal material of the display. Touch sensors and thin film transistors may be located below the shielding layer.

22 Claims, 19 Drawing Sheets

ELECTRIC FIELD SHIELDING FOR IN-CELL TOUCH TYPE THIN-FILM-TRANSISTOR LIQUID CRYSTAL DISPLAYS

BACKGROUND

This relates generally to displays, and, more particularly, to displays that include protective layers that prevent the operation of the display from being disrupted from electric fields.

Displays are widely used in electronic devices to display images. Displays such as liquid crystal displays display images by controlling liquid crystal material associated with an array of image pixels. A typical liquid crystal display has a color filter layer and a thin film transistor layer formed between polarizer layers. The color filter layer has an array of pixels each of which includes color filter subpixels of different colors. The thin film transistor layer contains an array of thin film transistor circuits. The thin film transistor circuits can be adjusted individually for each subpixel to control the amount of light that is produced by that subpixel pixel. A light source such as a backlight may be used to produce light that travels through each of the layers of the display.

A layer of liquid crystal material is interposed between the color filter layer and the thin film transistor layer. During operation, the circuitry of the thin film transistor layer applies signals to an array of electrodes in the thin film transistor layer. These signals produce electric fields in the liquid crystal layer. The electric fields control the orientation of liquid crystal material in the liquid crystal layer and change how the liquid crystal material affects polarized light.

An upper polarizer is formed on top of the display and a lower polarizer is formed on the bottom of the display. As light travels through the display, the adjustments that are made to the electric fields in the liquid crystal layer are used to control the image that is displayed on the display.

In many electronic devices, it is desirable to incorporate touch screen functionality into a display. Touch screens can be used to provide a device with a touch interface. A touch interface may allow users to interact with a device through on-screen touch commands such as finger taps and swipes.

A typical touch screen includes a touch panel with an array of touch sensor electrodes. Touch sensor processing circuits can measure capacitance changes on the touch sensor electrodes to determine the position at which a user's finger is contacting the touch array.

When an external object such as a user's finger comes into contact with a display, there is a potential for electrostatic charges on the user's finger to create large electric fields in the display. These electric fields may disrupt the operation of the display. For example, the electric fields from an electrostatic charge may interfere with the electric fields created by the electrodes of the thin-film-transistor layer. This can create spots or other visual artifacts on the screen.

In some liquid crystal displays that include touch panels, the touch panel may be located above the liquid crystal layer. In this type of situation, the electrodes of the touch sensor array may prevent charge-induced electric fields from reaching the liquid crystal layer.

It may sometimes be desirable to construct a display with different touch sensor configurations. For example, it may be desirable to incorporate a touch sensor electrodes into a display at a location that is below the liquid crystal layer. This type of display is sometimes referred to as an in-cell display. If care is not taken, however, the display will be susceptible to disruptions from electrostatic charge, because the touch sensor electrodes will not prevent charge-induced electric fields from reaching the liquid crystal layer.

It would therefore be desirable to provide displays such as liquid crystal displays that have improved electric field shielding layers.

SUMMARY

Displays may be used in electronic devices to display images for a user. A display may include image pixels that are formed from a layer of liquid crystal material. A color filter layer that includes color filter elements may be located above the liquid crystal layer to provide color to the images. The liquid crystal layer may be controlled by electric fields produced using transistors and electrodes in a thin-film-transistor layer. Touch sensor capabilities may be incorporated into the display using an array of touch sensor electrodes. The touch sensor electrodes may be formed on the thin-film-transistor layer or other layer below the liquid crystal layer.

When a user or other external object touches the surface of the display, electrostatic charges give rise to electric fields. To ensure that these electric fields do not disturb the liquid crystal layer, one or more transparent electric field shielding layers may be incorporated into the display above the liquid crystal layer.

The shielding layers may be formed from conductive adhesive, metal oxides, conductive polymers, materials that include nanostructures such as carbon nanotubes, materials that include metal particles, conductive inks, or other conductive materials. The resistivity of a shielding layer may be small enough to prevent disruptions to the liquid crystal layer and large enough to avoid blocking operation of the touch sensor electrodes.

A switch may be used to selectively ground the electric field shielding layer. Openings may be formed within an electric field shielding layer to increase resistivity. Protective layers of material may be included in a shielding layer to ensure that a conductive layer portion in the shielding layer is stable. Shielding layers may be formed by incorporating dopant into a thin surface layer in an insulating substrate. Islands of material in an electric field shielding layer may be joined together using an additional layer of conductive material.

A shielding layer for a display may be provided by using an antistatic polarizer layer that includes a conductive layer. Shielding layers may also be incorporated into the color filter structures of a display. For example, a black mask in a color filter may be implemented using a conductive material, a conductive layer may be interposed between an overcoat layer and color filter elements in a color filter, or an overcoat layer may be formed using conductive materials.

A display may have polyimide layers adjacent to the liquid crystal layer. Conductive shielding layers may be interposed between the polyimide layers and adjacent layers.

A conductive ring such as a ring of indium tin oxide may be used to help short the electric field shielding layer to a terminal such as a ground terminal on a thin-film-transistor layer.

Further features of the invention, its nature and various advantages will be more apparent from the accompanying drawings and the following detailed description of the preferred embodiments.

DETAILED DESCRIPTION

Figure 1:
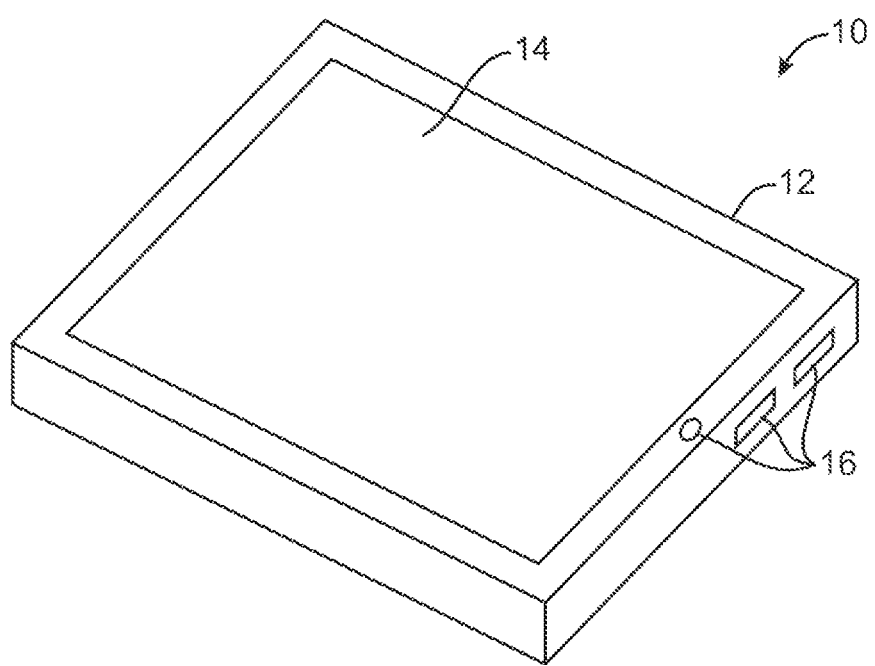
FIG. 1 is a perspective view of an illustrative electronic device that may be provided with a display in accordance with an embodiment of the present invention.

An electronic device of the type that may be provided with a display is shown in FIG. 1. As shown in FIG. 1, electronic device 10 may have a housing 12. Buttons, input-output ports, and other components 16 may be provided in housing 12. Display 14 may be mounted in housing 12 on the front surface of device 10 (as shown in FIG. 1) or may be mounted in other suitable locations within housing 12. If desired, housing 12 may have multiple sections such as first and second sections that are connected with a hinge.

Electronic device 10 may be a computer monitor for a desktop computer, a kiosk, a table-based computer, a portable computer such as a laptop or tablet computer, a media player, a cellular telephone or other handheld computing device, or may be a somewhat smaller portable device. Examples of smaller portable electronic devices include wrist-watch devices and pendant devices. These are merely examples. In general, display 14 may be incorporated into any suitable electronic device.

Figure 2:
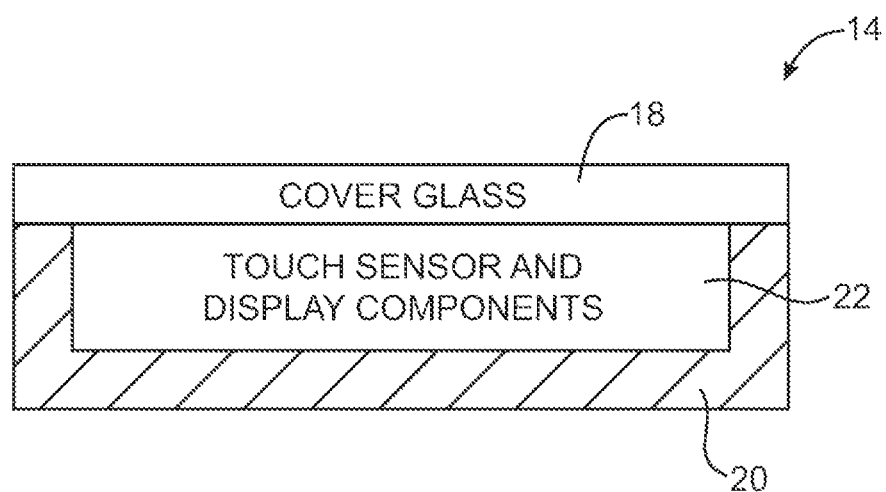
FIG. 2 is a cross-sectional side view of an illustrative display in an electronic device in accordance with an embodiment of the present invention.

FIG. 2 is a cross-sectional side view of display 14. As shown in FIG. 2, a cover glass layer such as cover glass 18 may be used to provide display 14 with a robust outer surface. Cover glass layer 18 may be formed from glass, plastic, other suitable materials, or combinations of these materials.

Touch sensor and display components 22 may be housed in housing structures 20. Structures 20 may include plastic chassis members, metal chassis structures, housing structures (e.g., part of housing 12 of FIG. 1), or other suitable mounting or support structures.

Touch sensor and display components 22 may include display image pixel structures such as display electrodes and display circuitry for controlling the display electrodes. Touch sensor and display components 22 may also include a touch sensor. The touch sensor may, for example, be formed from touch sensor electrodes. The touch sensor electrodes may be mounted on a dielectric substrate such as plastic or glass to form a touch panel. Display electrodes may be mounted on a display layer such as a thin-film transistor layer or may be mounted on multiple layers of material. If desired, some or all of the touch sensor electrodes and display electrodes may be formed on a common substrate (e.g., as different deposited layers on a thin-film-transistor layer). Other configurations may be used if desired. These touch sensor and display electrode configurations are merely illustrative.

Figure 3:
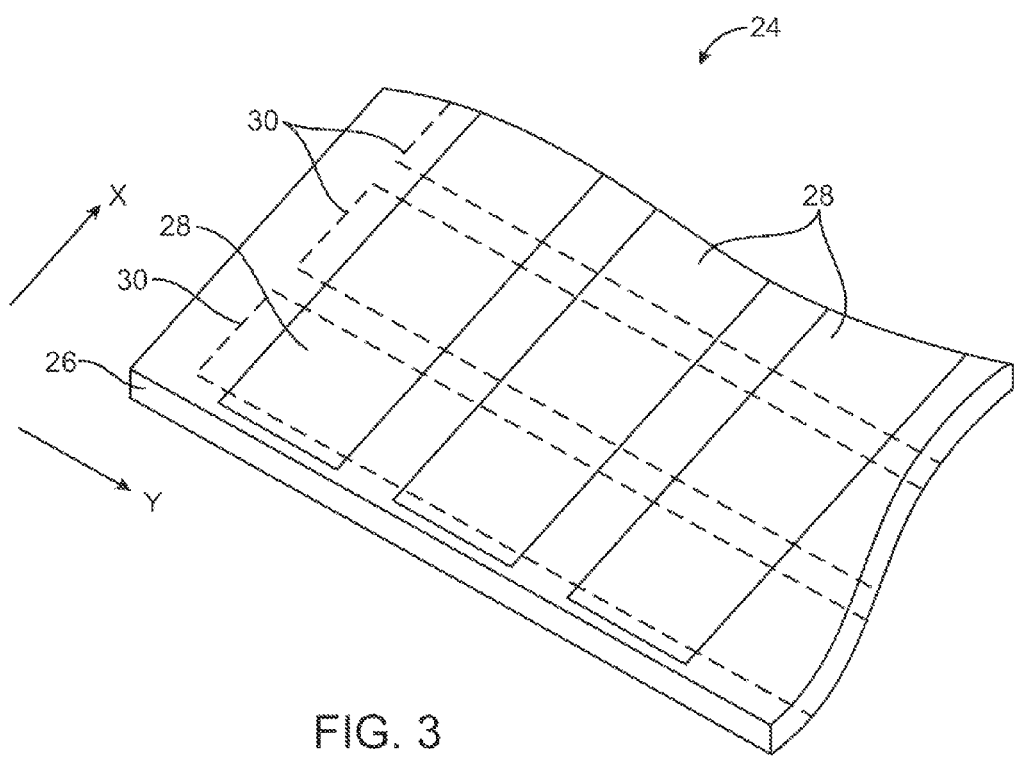
FIG. 3 is a perspective view of an illustrative array of touch sensor electrodes in a touch sensor in accordance with an embodiment of the present invention.

A perspective view of a typical touch panel is shown in FIG. 3. As shown in FIG. 3, panel 24 may include a upper touch sensor electrodes 28 that run perpendicular to lower touch sensor electrodes 30. Electrodes 28 and 30 may be mounted to the upper and lower surfaces of substrate 26 or may be supported using other arrangements. Electrodes 28 and 30 may be formed from a transparent conductive material such as indium tin oxide (ITO) or other suitable material. Dielectric layer 26 may be formed from glass, plastic, a layer of dielectric material that is deposited using sputtering, spraying, or other deposition techniques, or other suitable materials.

When a user's finger or other external object comes into contact with the touch panel (or is placed in the vicinity of the touch panel) capacitance changes may be detected using electrodes 28 and 30. These capacitance changes may be used to produce location information. In particular, the square intersections between electrodes 28 and 30 that are shown in FIG. 3 allow measurement of the point at which a user's finger or other external object touches panel 24 in terms of lateral dimensions X and Y. If desired, a touch sensor for display 14 may be formed using other touch technologies (resistive touch sensors, acoustic touch sensors, etc.).

Display 14 may, in general, be based on any suitable display technology (liquid crystals, organic light-emitting diodes, plasma cells, electronic ink arrays, etc.). Examples that use liquid crystal technology are sometimes described herein as an example.

Figure 4:
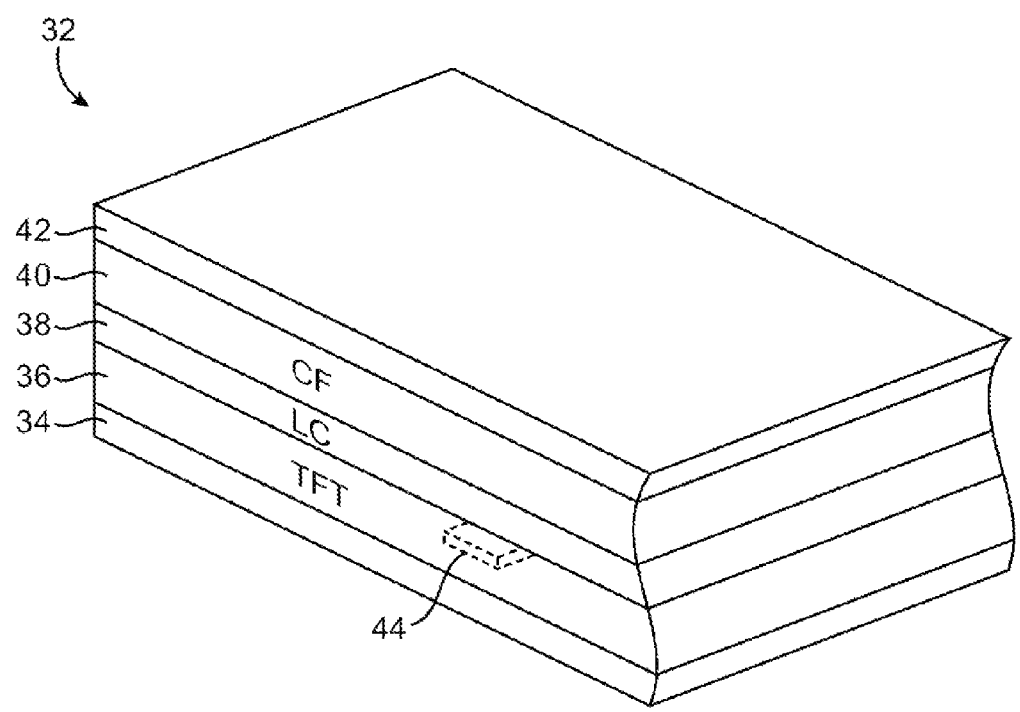
FIG. 4 is a perspective view showing layers of components that may be used in a liquid crystal display in accordance with an embodiment of the present invention.

A perspective view of illustrative liquid crystal display structures 32 that may be used in display 14 is shown in FIG. 4. As shown in FIG. 4, liquid crystal display structures 32 may include color filter (CF) layer 40 and thin-film-transistor (TFT) layer 36. Color filter layer 40 may include an array of colored filter elements. In a typical arrangement, the pixels of layer 40 each include three colored subpixels (e.g., red, green, and blue subpixels). Liquid crystal (LC) layer 36 includes liquid crystal material and is interposed between color filter layer 40 and thin-film-transistor layer 36. Thin-film-transistor layer 36 may include electrical components 44 such as transistors coupled to electrodes for controlling the electric fields that are applied to liquid crystal layer 36. If desired, components 44 may include touch sensor components such as touch sensor electrodes 28 and 30.

Additional optical layers 42 and 34 may be formed above and below color filter layer 30, liquid crystal layer 38, and thin-film-transistor layer 36. Additional optical films 42 and 34 may include polarizing layers, so optical films 42 and 34 are sometimes referred to as polarizing layers or polarizers ("POL").

Figure 5:
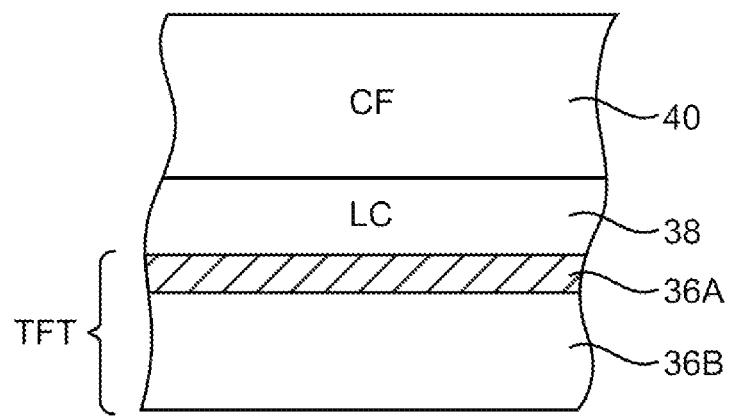
FIG. 5 is a cross-sectional side view of layers in an illustrative display having a thin-film-transistor and touch sensor layer in accordance with an embodiment of the present invention.

Touch sensor structures may be incorporated into the layers of display structures 32 (e.g., by including both touch sensor and thin-film-transistor components in components 44 of layer 36 of FIG. 4). This type of arrangement is shown in FIG. 5. As shown in FIG. 5, thin-film-transistor layer TFT may include layers 36A and 36B. Layer 36B may be formed form a dielectric substrate such as a layer of glass or plastic. Layer 36A may include both thin-film-transistor structures such as transistors and electrodes for controlling the electric fields in liquid crystal layer 38 and touch sensor electrodes (e.g., capacitive electrodes such as electrodes 28 and 30 of FIG. 3). Other configurations may be used if desired. The illustrative arrangement for combining TFT structures and touch structures into layer TFT that is shown in FIG. 5 is merely illustrative.

In situations such as those in which display 14 does not have a touch panel above its liquid crystal layer, there is a risk that electrostatic charges that are imposed on the cover glass layer of the display will create electric fields in the liquid crystal layer that disrupt proper operation of the display. This risk can be addressed by providing display 14 with one or more electric field shielding layers above liquid crystal layer 38.

To ensure that the electric field shielding layer prevents electrostatic charges on the surface of display 14 from interfering with the operation of liquid crystal layer 38, this shielding layer should have sufficient conductivity. At the same time, care should be taken that the shielding layer is not too conductive, because this would interfere with the capacitive sensing functions of the touch sensor. Preferably the resistivity of the shielding layer is between 10 M-ohm/square to 10 G-ohm/square. Shielding layer films with a resistivity in this range may sometimes be referred to as having a medium-high resistance. The shielding layer is not insulating (because that would prevent the shielding layer form being effective at blocking the effects of electrostatic charge). At the same time, the shielding layer is only moderately conductive, because a highly conductive conductor would provide too much shielding and would block the touch sensor.

In general, the shielding layer may be formed from any suitable material that exhibits a suitable resistivity while exhibiting satisfactory transparency in the visible spectrum. To ensure that the display is efficient at emitting light, it is generally desirable that the shielding layer have a transmittance of about 80% or more, 90% or more, 95% or more, or preferably 96% or more, or 97% or more. Shielding layers with lower values of transmittance may be used, but will tend to dim the display.

Examples of materials that may be used in forming the shielding layer include conductive oxides (e.g., indium tin oxide, antimony oxide, tin oxide, zinc oxide, other metal oxides, metal oxides that contain multiple metals, etc.), nanomaterials (e.g., nanotube materials such as carbon nanotube materials), conductive polymers (metallic conductors or semiconductors), conductive inks, conductive mixtures of particles and binders, thin layers of metals, mixtures or chemical combinations of these materials, layered stacks including multiple layers of each of these materials, etc.

Shielding layer materials may be deposited on dedicated films (e.g., glass substrates, ceramic substrates, plastic substrates, or other dielectric substrates) or may be deposited on other layers of material in display 14 (e.g., on top of or beneath a color filter substrate, a polarizer layer, a thin-film-transistor substrate, other optical film layers, etc.).

Techniques that may be used in depositing the shielding layer include spraying, dipping, dripping, spin-coating, pad printing, evaporation, sputtering, electrochemical deposition, chemical vapor deposition, ion implantation, diffusion, gluing, or other suitable fabrication technique.

In discussing the layers that may be used in display 14, certain layers are sometimes said be "above" or "below" other layers. A layer that is above another structure is higher in the stack than that structure and is therefore closer to the exposed outer surface of display 14. A layer that is below another structure is lower in the stack of layers in display 14 than the that structure. In general, the shielding layer will be formed above layer 38 (i.e., the shielding layer will be higher in the stack of layers in display 14 than layer 38 and therefore closer to the exposed outer surface of display 14 than layer 38). This will help prevent charge-induced fields from disrupting the liquid crystal material of layer 38. The shielding layer will generally also be above the touch sensor array. Illustrative locations for forming the shielding layer are described in the following examples.

Figure 6:
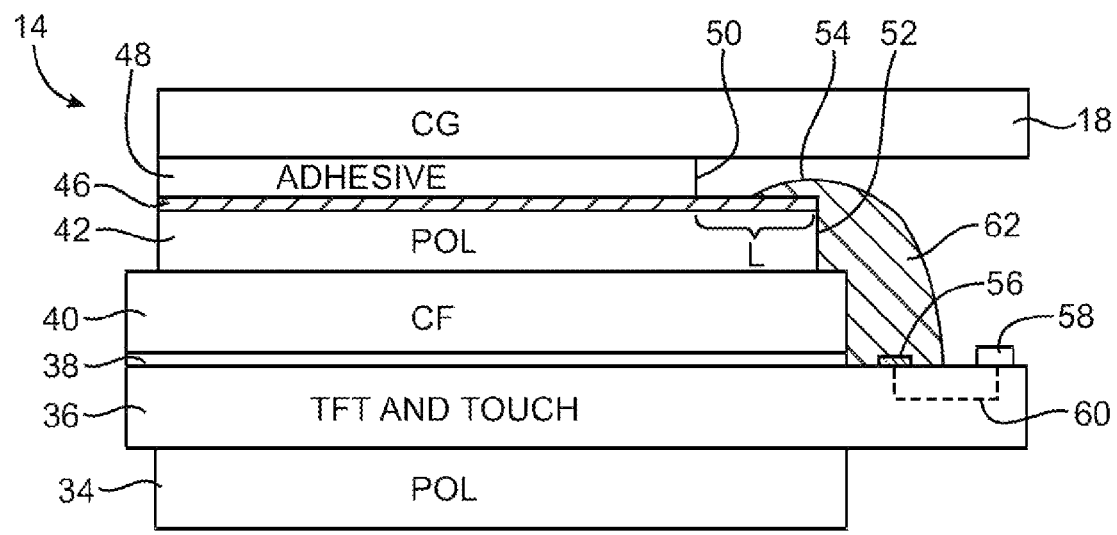
FIG. 6 is a cross-sectional side view of an illustrative display that has a shielding layer above an upper polarizer in accordance with an embodiment of the present invention.

In the example shown in FIG. 6, electric field shielding layer ("shielding layer") 46 is formed on top of polarizer 42. Adhesive 50 may be used to attach cover glass 18 to shielding layer 46 and therefore upper polarizer 42. A conductive structure such as conductive structure 62 may be used to form an electrical pathway that shorts shielding layer 46 to a terminal such as ground pad 56. Ground pad 56 may be formed from a conductive trace on thin-film-transistor and touch sensor structures 36 (sometimes referred to herein as "TFT layer 36"). Components on the TFT layer 36 such as ground trace 56 and driver integrated circuit 58 may be interconnected using traces such as trace 60. These traces may be connected to one or more flex circuits (sometimes referred to as "display flex" and "touch flex") using traces on TFT layer 36. Flex circuits such as these may be attached to TFT layer 36 using conductive adhesive (sometimes referred to as "anisotropic conductive film" or ACF). The end of a flex circuit that is not attached to TFT layer 36 may be connected to a printed circuit board (e.g., a main logic board).

Contacts such as contact 56 on TFT layer 36 may be maintained at a suitable voltage such as a ground voltage and are therefore sometimes referred to as ground contacts or ground. By using conductive structure 62 to connect shielding layer 46 to ground or other suitable potentials, electric fields that are generated by charge on cover glass 18 can be prevented from reaching the layers beneath layer 46.

Conductive structure 62 may be formed from a conductive paste (e.g., a dot of silver or gold paint or other metal paste), conductive adhesive, or any other suitable conductive material. These structures are sometimes referred to herein as conductive dots, because structure 62 may be formed in the shape of a dot (as an example). If desired, conductive structures 62 can be formed in the shape of an elongated line of materials running along the edge of shielding layer 46.

Adhesive 48 may be a pressure sensitive adhesive or a liquid adhesive (as examples). When implementing adhesive layer 48 using a layer of pressure sensitive adhesive, it may be desirable to restrict the size of layer 48. For example, edge 50 of layer 48 may be recessed (cut-back) from edge 52 of polarizer 42 by a distance L. This ensures that pressure sensitive adhesive 48 and cover glass 18 will not exert excess downwards pressure onto conductive dot 62 in region 54. Excess pressure in this region might lead to the formation of bubbles and other imperfections at the interface between adhesive 48 and cover glass 18 and at the interface between adhesive 48 and polarizer 42. The cut-back region (recess L) may be formed along the entire edge of polarizer 42 or may only be formed in the corner of polarizer 42. One, two, three, or four corners (or edges) of display 14 may be provided with conductive structures such as structure 62 and associated recessed adhesive regions.

If desired, layer 48 may be regular (non-conducting) pressure sensitive adhesive (or liquid adhesive) and shielding layer 46 may be a layer of transparent conductive pressure sensitive adhesive. Shielding layer 46 may also be formed from other transparent conductive structures (e.g., conductive polymers, metal oxides, conductive inks, conductive nanomaterials, etc.).

Figure 7:
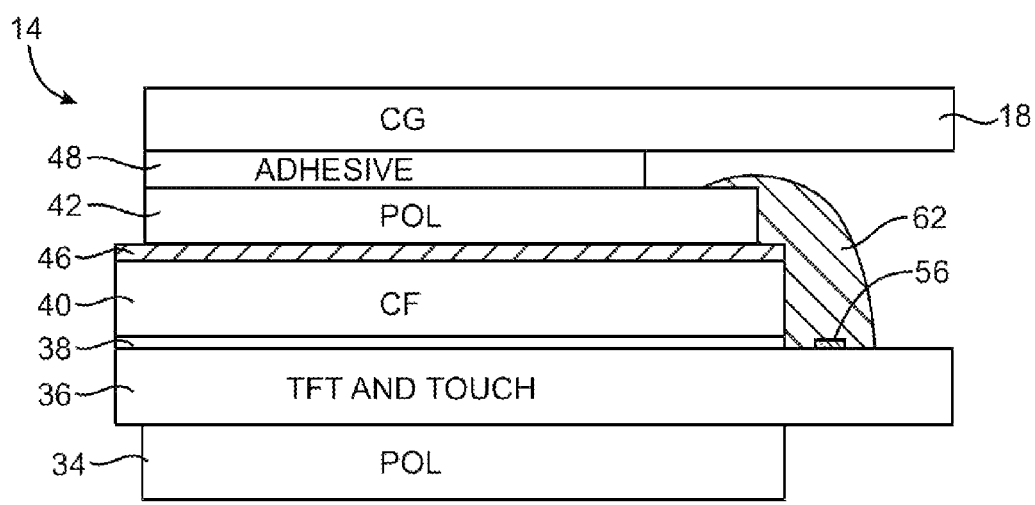
FIG. 7 is a cross-sectional side view of an illustrative display that has a shielding layer below an upper polarizer in accordance with an embodiment of the present invention.

If desired, shielding layer 46 may be formed under polarizer 42, as shown in FIG. 7. Shielding layer 46 of FIG. 7 may, for example, be formed from a layer of transparent conductive adhesive that has been applied to the top surface of color filter layer 40 (as an example). As with the other examples presented herein, shielding layer 46 may also be formed from other suitable materials (e.g., conductive polymers, metal oxides, conductive inks, conductive nanomaterials, combinations of these layers, etc.).

Figure 8:
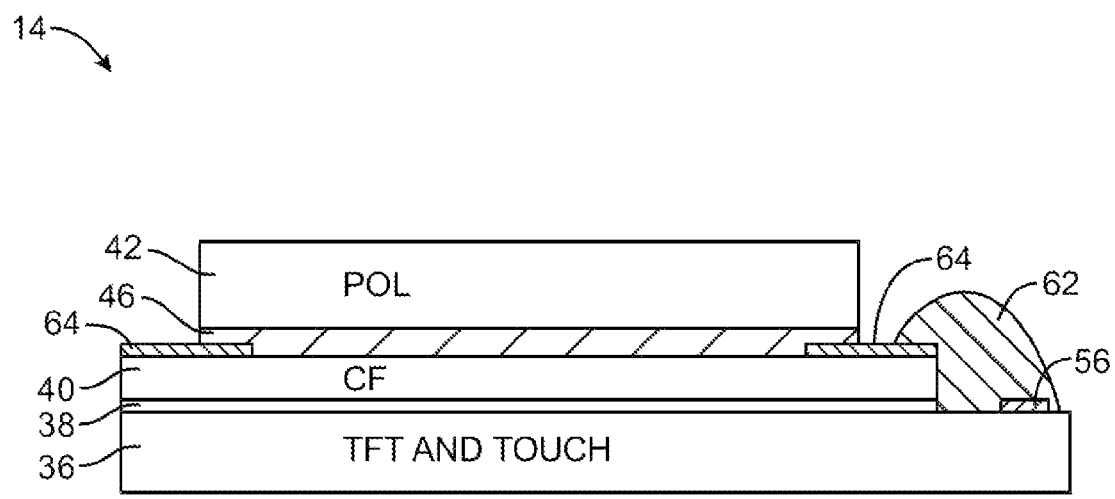
FIG. 8 is a cross-sectional side view of an illustrative display having a conductive peripheral ring that assists in grounding a shielding layer in accordance with an embodiment of the present invention.

It may be desirable to form a ring of conductive material around the periphery of color filter layer 40 to help in forming a conductive grounding path between shielding layer 46 and ground 56 on TFT layer 36. The use of a ring of conductive material may help distribute ground evenly around shielding layer 46. A cross-sectional side view of a stack of layers in display 14 showing how conductive ring 64 may be formed around the periphery of the top surface of color filter layer 40 is shown in FIG. 8. Shielding layer 46 in FIG. 8 may be a layer of conductive adhesive (as an example). Conductive ring 64 may be formed from a patterned layer of ITO or other conductive materials (e.g., metal, conductive ink, a conductive nanomaterial, etc.).

Figure 9:
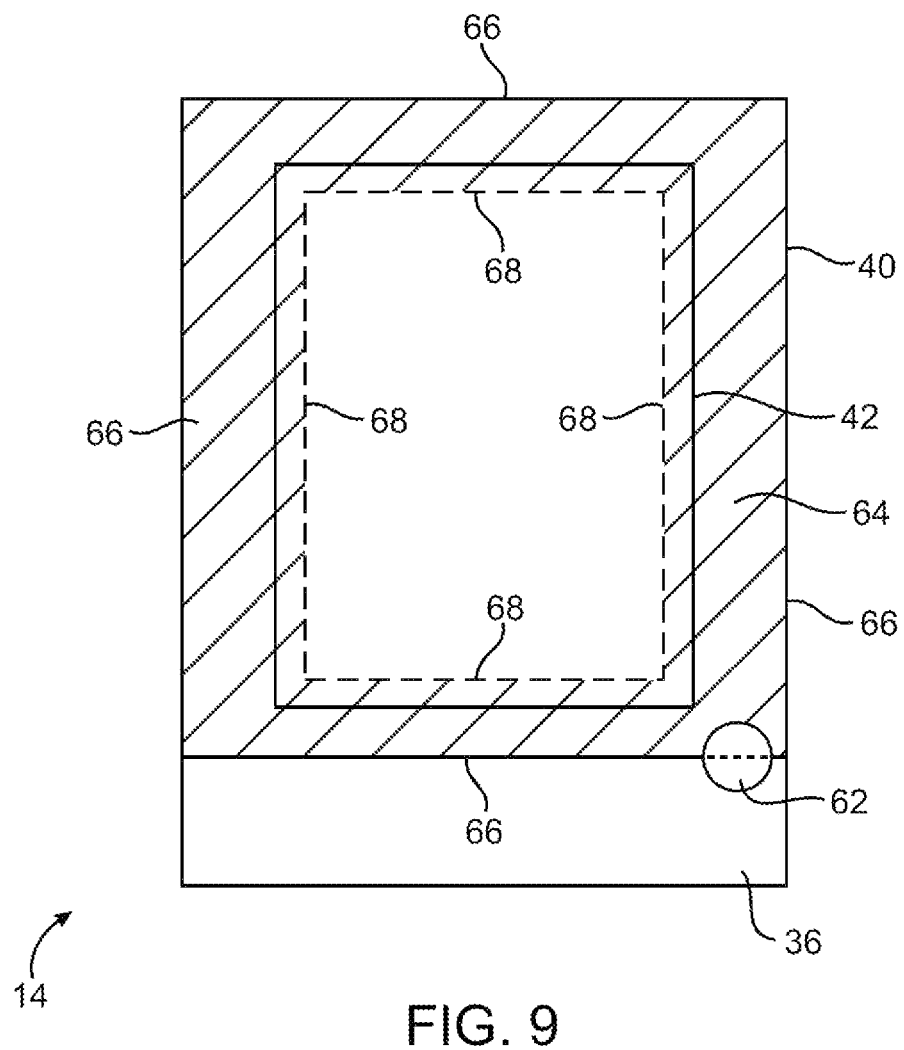
FIG. 9 is a top view of an illustrative display that has a conductive peripheral ring of the type shown in FIG. 8 in accordance with an embodiment of the present invention.

FIG. 9 is a top view showing how conductive ring 64 may have an outer edge 66 and an inner edge 68. Shielding layer 46 may be electrically connected to conductive dot 62 through conductive ring 64. Conductive dot 62 may short ring 64 to ground 56 (FIG. 8).

Figure 10:
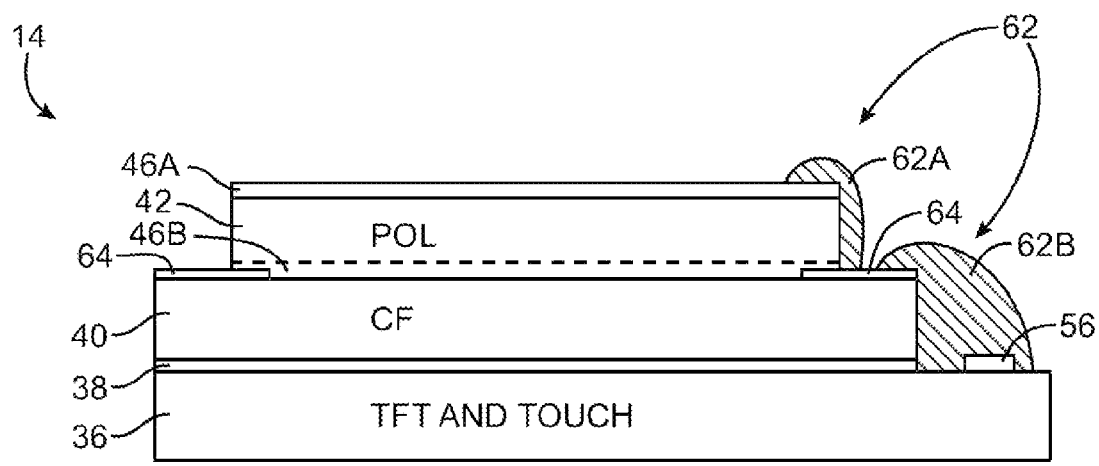
FIG. 10 is a cross-sectional side view of an illustrative display that has two shielding layers and a conductive peripheral ring that is used to help form a conductive grounding path in accordance with an embodiment of the present invention.

If desired, display 14 may be provided with multiple shielding layers. This type of arrangement is shown in FIG. 10. As shown in FIG. 10, upper shielding layer 46A may be formed on top of polarizer 42 and lower shielding layer 46B may be formed beneath polarizer 42. Conductive structure 62 may include upper conductive dot 62A and lower conductive dot 62B. Conductive structure 62A may electrically connect shielding layer 46A to conductive ring 64. Shielding layer 46B may be electrically connected to conducting ring 64. Conductive structure 62B may electrically connect conductive ring 64 and therefore shielding layers 46A and 46B to ground contact 56 on TFT layer 36. Shielding layers 46A and 46B may be formed from conductive adhesive, conductive polymers, conductive metal oxides, conductive inks, conductive nanomaterials, or other suitable materials.

If desired, polarizer 42 may be an antistatic polarizer layer and the shielding layer (e.g., shielding layer 46A of FIG. 10) may be a conductive layer that is formed as part of the antistatic polarizer layer.

Figure 11:
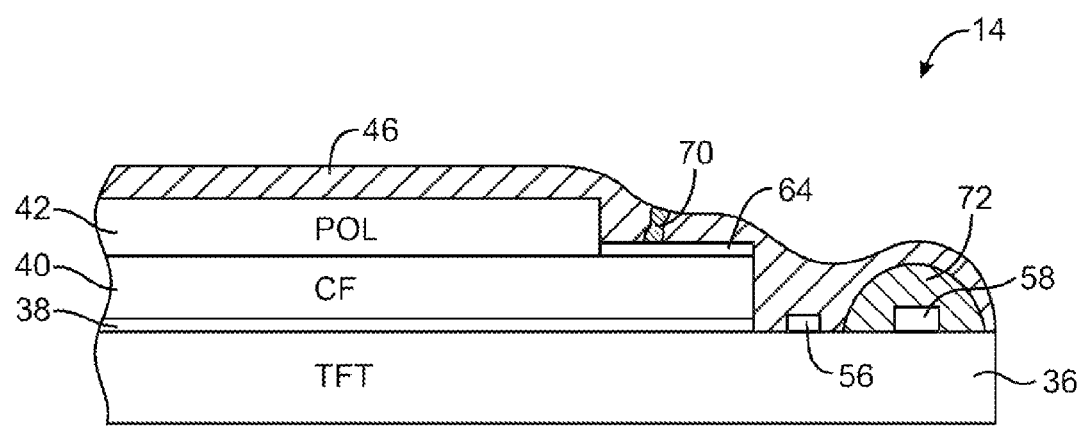
FIG. 11 is a cross-sectional side view of an illustrative display that has a spray-coated shielding layer and that uses a masking layer to protect a driver integrated circuit from the spray-coated shielding layer in accordance with an embodiment of the present invention.

As shown in FIG. 11, shielding layer 46 may be deposited using spray coating techniques. For example, shielding layer 46 may be a transparent conductive ink that is sprayed on top of polarizer 42. To protect display driver integrated circuit 58 and other circuitry on TFT layer 36, a masking structure such as encapsulant dot 72 may be formed over circuitry 58. Encapsulant dot 72 may be formed from an insulating polymer mask material or other suitable materials that are able to insulate circuitry 58 from shielding layer 46. It is possible that shielding layer 46 could develop small breaks or cracks such as break 70. This might form a open circuit or a high-resistance path between the portion of shielding layer 46 that is on top of polarizer 42 and the portion of shielding layer 46 near ground contact 56. Conductive ring 64 (e.g., an ITO ring) may therefore be used to provide a redundant circuit pathway and that helps ensure that there is a sufficiently low resistance path between the shielding layer portion on top of polarizer 42 and ground contact 56, even in the presence of high-resistance features such as break 70.

Figure 12:
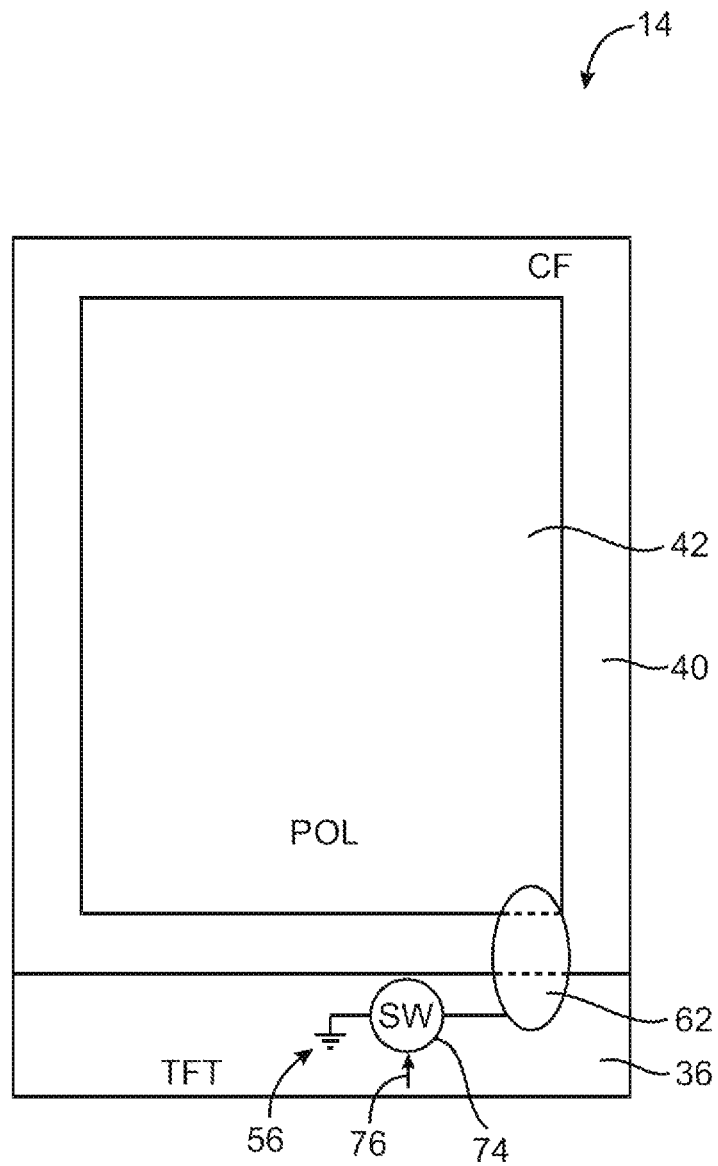
FIG. 12 is a to view of an illustrative display in which a switch is used to selectively ground a shielding layer in accordance with an embodiment of the present invention.

If desired, a switch such as switch 74 of FIG. 12 may be interposed between shielding layer 46 (i.e., a shielding layer on top of polarizer 42 or other suitable shielding layer) and ground contact 56. Switch 74 may be formed from passive components (e.g., one or more diodes) or active components (e.g., one or more transistors). Switch 74 may be controlled by control signals on control input 76. For example, switch 74 can be placed in an open condition when it is desired to isolate the shielding layer and thereby minimize its shielding effect (i.e., during predetermined touch sensing intervals) and can otherwise be placed in a closed condition to maximize the shielding ability of the shielding layer. To reduce the shielding effect of the shielding layer when switch 74 is open, the shielding layer may be divided into small sections (e.g., strips, squares, etc.) each of which can be provided with a respective switch (as an example).

Figure 13:
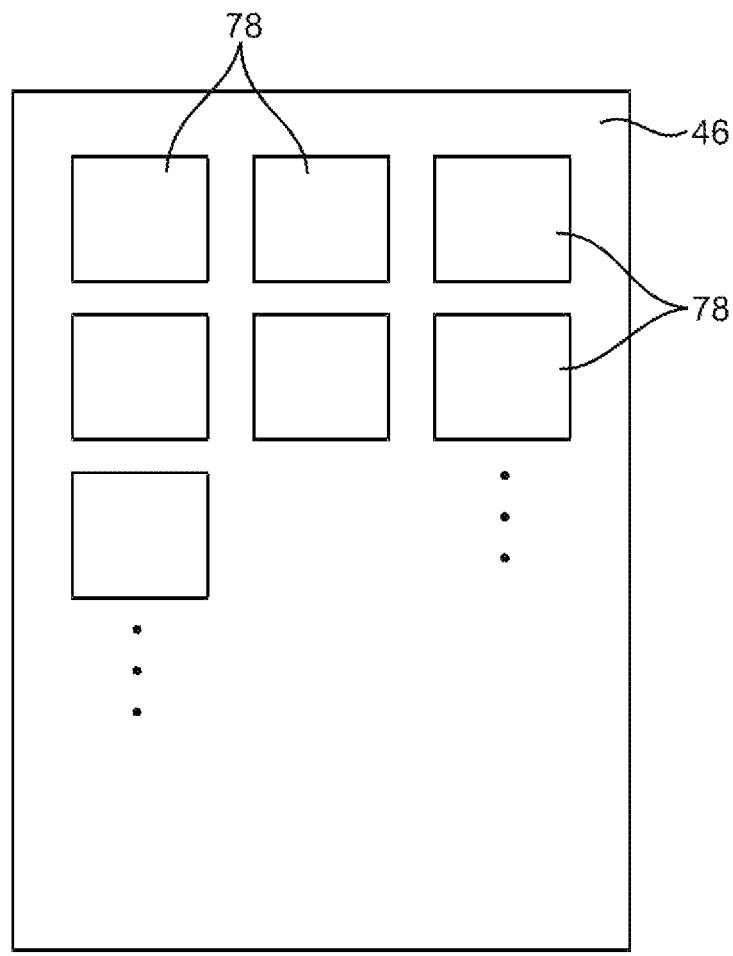
FIG. 13 is a top view of an illustrative shielding layer with openings that reduce the resistivity of the shielding layer in accordance with an embodiment of the present invention.

FIG. 13 shows how shielding layer 46 may be patterned. In the FIG. 13 example, shielding layer 46 has a mesh pattern in which rectangular openings 78 are free of shielding layer material. Shielding layer material is present in the other shield regions (i.e., outside of rectangles 78). By reducing the amount of shield material that is present, the resistivity of the shielding layer may be increased to within its preferred range (between 10 M-ohm/square and 10 G-ohm/square), even if the shield material that is present has a lower resistivity. This approach for increasing the overall resistivity of the shielding layer by selective removal of shielding layer material may make it possible to use more conductive (and more reliably deposited) shielding layer substances than would otherwise be possible. For example, shielding layer 46 may be formed from a layer of ITO that has a resistivity of less than 10 M-ohm/square in a bulk (unpatterned) film.

The shielding layer may be patterned using a shadow mask or using photolithography. After patterning, the modified-area shielding layer will exhibit an increased resistivity (i.e., greater than 10 M-ohm/square). A patterned shielding layer of the type show in FIG. 13 may be formed on top of polarizer 42 or on top of color filter layer 40 (as examples). Any of the shielding layers in the examples described herein may be provided with removed areas to increase resistivity in this way if desired.

In conventional color filter layers, a non-conductive black masking layer is typically used to prevent light leakage between color filter elements (i.e., light leakage elements such as red, green, and blue subpixel filters).

Figure 14:
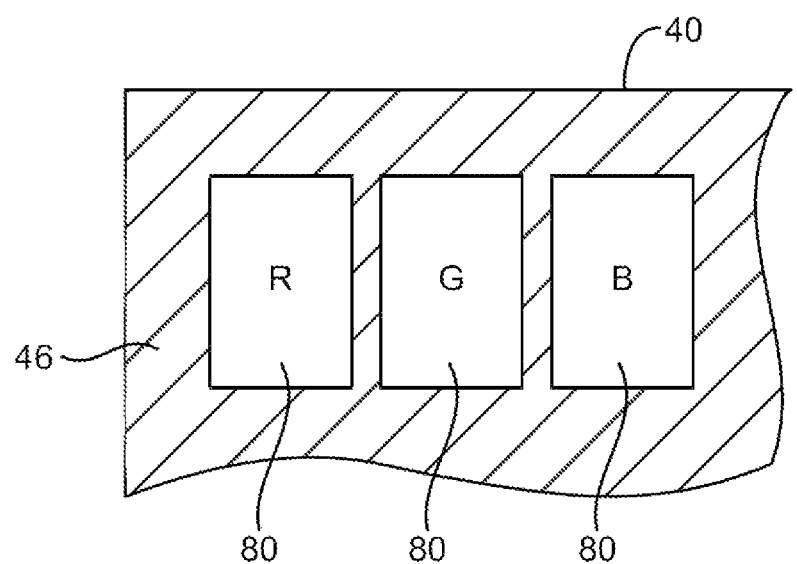
FIG. 14 is a bottom view of an illustrative color filter layer showing how the color filter elements of the color filter layer may be surrounded by an opaque masking layer that serves as a shielding layer in accordance with an embodiment of the present invention.

If desired, an opaque mask on a color filter such as a patterned layer of black masking material may be formed from a conductive opaque (e.g., black) material and can serve as shielding layer 46. FIG. 14 is a top view of a portion of color filter layer 40 showing how shielding layer 46 may be implemented using a patterned conductive mask layer (the portions outside color filter elements 80). The patterned conductive mask layer may have a resistivity within the preferred range for shielding layer 46 (i.e., between 10 M-ohm/square and 10 G-ohm/square). Materials that may be used to form conductive mask 46 include chromium, chromium oxide, conductive black ink, and polymer resin (e.g., with added metal particles to lower the resistivity of the mask to a desired level).

Figure 15:
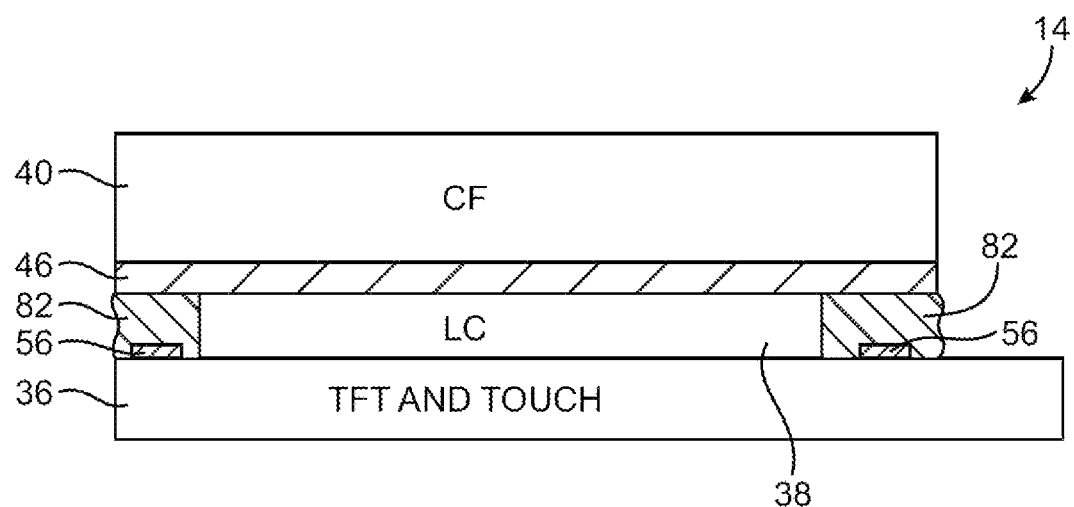
FIG. 15 is a cross-sectional side view of an illustrative display in which a shielding layer that has been formed from a conductive black mask layer is shorted to a ground contact on a thin-film-transistor and touch sensor layer in accordance with an embodiment of the present invention.

Conductive mask layer 46 of FIG. 14 may be electrically connected to ground contact 56 on layer 36 using conductive structures. As shown in FIG. 15, conductive structures 82 may be used to electrically connect color filter mask layer 46 to ground contacts 56. Conductive structures 82 may be formed from conductive ink or, with one particularly suitable arrangement, may be formed from conductive sealant material (e.g., conductive epoxy, non-conductive sealant that is rendered conductive upon application of heat and pressure due to the inclusion of gold-coated plastic balls, or other conductive materials etc.). When structures 82 are implemented using sealant, structures 82 may surround the entire rectangular periphery of color filter layer 40. This seals liquid crystal layer 38. At the same time, the conductive nature of seal structures 82 may be used in electrically connecting mask shielding layer 46 to ground 56.

In conventional color filter layers, the color filter elements and black mask regions are coated with a blanket overcoat layer of clear polymer.

Figure 16:
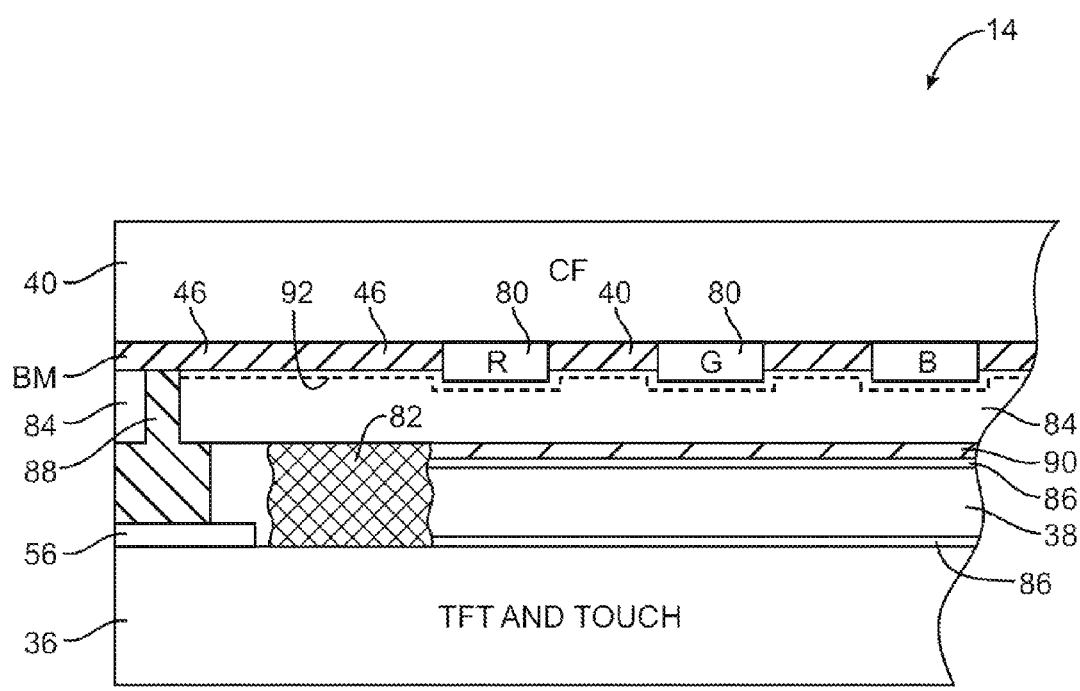
FIG. 16 is a cross-sectional side view of an illustrative display that has one or more shielding layers formed from a masking layer, an overcoat layer, a layer interposed between an overcoat layer and a masking layer, and a layer adjacent to a polyimide layer in accordance with an embodiment of the present invention.

FIG. 16 shows how a via (via 88) may be formed in clear polymer overcoat layer 84 on color filter layer 40 and shows how the via may be filled with a conductive material. Via structure 88 may be, for example, a dot of metal paint (e.g., silver paint) or may be formed from conductive sealant. Conductive via structure 88 may be used to electrically connect conductive opaque patterned masking layer 46 on color filter layer 40 to ground structure 56 on layer 36. In arrangements of the type shown in FIG. 16 in which conductive structure 88 is used to short shielding layer 46 to ground 56, sealant 82 may be formed from conductive sealant material or non-conductive sealant material.

Display 14 may include polyimide layers 86 (sometimes referred to as "PI" layers) immediately above and below liquid crystal layer 38. PI layers 86 help align the liquid crystal material in a desired orientation. If desired, a conductive layer such as conductive layer 90 may be interposed between the upper PI layer and overcoat 84. Layer 90 may serve as shielding layer 46. Layer 90 may be formed from a transparent conductive polymer or other conductive material.

As indicated by dashed line 92, an optional blanket coating layer may be provided between black masking layer BM and overcoat layer 84. Layer 92 may be formed from a conductive material such as a transparent conductive polymer or other suitable shielding layer material and may serve as shielding layer 46. In this type of configuration, black mask layer BM may, if desired, be formed from insulating black ink. A shielding layer for display 14 may also be implemented by forming substantially all of overcoat layer from a shielding layer material (e.g., a transparent conductive polymer).

Combinations of these approaches may be used if desired. For example, display 14 may have a conductive overcoat 84 that serves as a shielding layer, a conductive layer such as layer 92 that is interposed between overcoat 84 and black mask 46 that serves as a shielding layer, a conductive black mask that serves as a shielding layer, and one or more layers 90 adjacent to PI layers 86 that serve as shielding layers, or may have any suitable combination of these shielding layers.

It can be challenging to deposit indium tin oxide uniformly at thicknesses that are sufficiently thin to form a shielding layer with a desired resistivity (i.e., a resistivity of between 10 M-ohm/square to 10 G-ohm/square). This is because indium tin oxide tends to form isolated areas (sometimes called islands) on a substrate when its thickness is reduced to obtain a resistivity of above 10 M-ohm/square. To ensure that a continuous film is formed for a shielding layer, the shielding layer may be formed using a two-step process.

Figure 17:
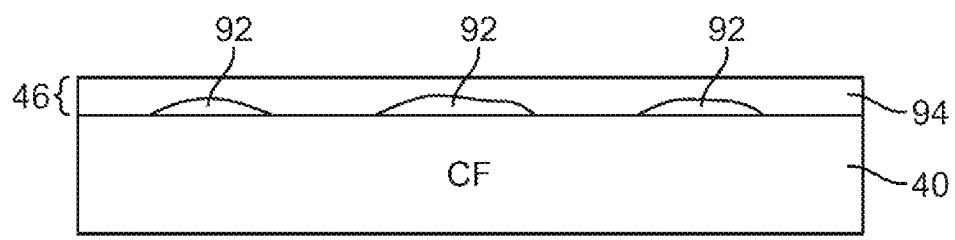
FIG. 17 is a cross-sectional side view of a shielding layer for a display showing how the shielding layer may be formed from a substance that is deposited in a thin layer having islands of material and a coating layer that covers and joins the islands of material in accordance with an embodiment of the present invention.

This type of approach is illustrated in FIG. 17. Initially, a layer of a first material (material 92) is deposited on substrate 40 (i.e., on the surface of the color filter layer). The first material may be, for example, indium tin oxide. To ensure that the resistivity of shielding layer 46 is not too low, the first material is deposited in a thin layer (e.g., hundreds of angstroms thick or less). When indium tin oxide is used as the first material, the resulting deposited layer will be segregated into separate regions such as islands 92. After the first layer has been deposited, a second layer of material (material 94) may be deposited.

The second layer of material serves as a bridging layer that electrically connects islands 92 to form a smooth continuous film for shielding layer 46. The second layer of material may be formed from a conductive polymer, a metal oxide, a conductive ink, nanomaterials or metal particles in a polymer matrix, other materials, or combinations of these materials.

Although illustrated in the context of a shielding layer that is formed on color filter layer 40 in the FIG. 16 example, a two-step process (or a three-step or more than three-step process) may be used when forming any shielding layer for display 14 if desired.

Figure 18:
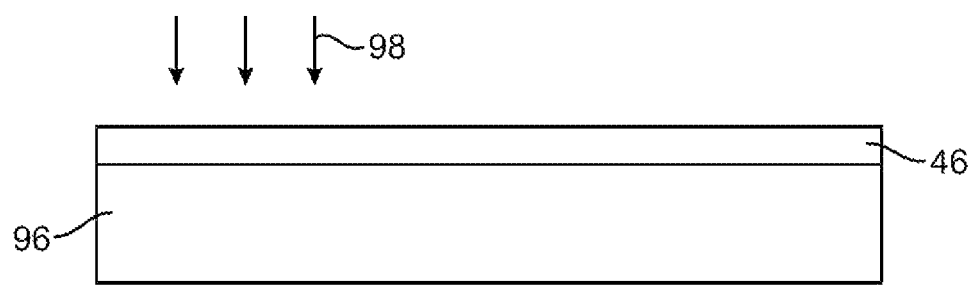
FIG. 18 is a cross-sectional side view of an insulating substrate layer in a display in which the top surface of the substrate layer has been converted into a conductive shielding layer for the display by incorporation of dopant in accordance with an embodiment of the present invention.

Shielding layer 46 may be formed by incorporating dopant into the surface of a substrate such as a glass layer. As shown in FIG. 18, for example, dopant (e.g., metal ions) may be implanted into the upper surface of glass substrate 96 using ion implantation (illustrated by arrows 98). Dopant may also be incorporated by diffusion (e.g., from a gas or a coating layer). By incorporating sufficient dopant, the top layer of substrate 96 may be provided with a desired resistivity (e.g., between 10 M-ohm/square to 10 G-ohm/square), whereas the remainder of substrate 96 may remain insulating. This allows the top layer of substrate 96 to serve as shielding layer 46. Glass substrate 96 may be a portion of cover glass 18, color filter 40, a polarizer, a separate layer of material, or other suitable layers in display 14. Shielding layer 46 may be about 1000 angstroms or less, 500 angstroms or less, 200 angstroms thick or less, or may be 100 angstroms thick or less (as examples).

Some transparent materials may be deposited in layers that have a suitable resistivity for forming shielding layer 46 (e.g., a resistivity of between 10 M-ohm/square to 10 G-ohm/square), but may not be as stable as desired. To ensure that shielding layer 46 is stable under a variety of environment conditions (e.g., over a wide range of humidity and pressure), one or more protective layers may be incorporated in shielding layer 46. An example of this type of approach is shown in FIG. 19.

Figure 19:
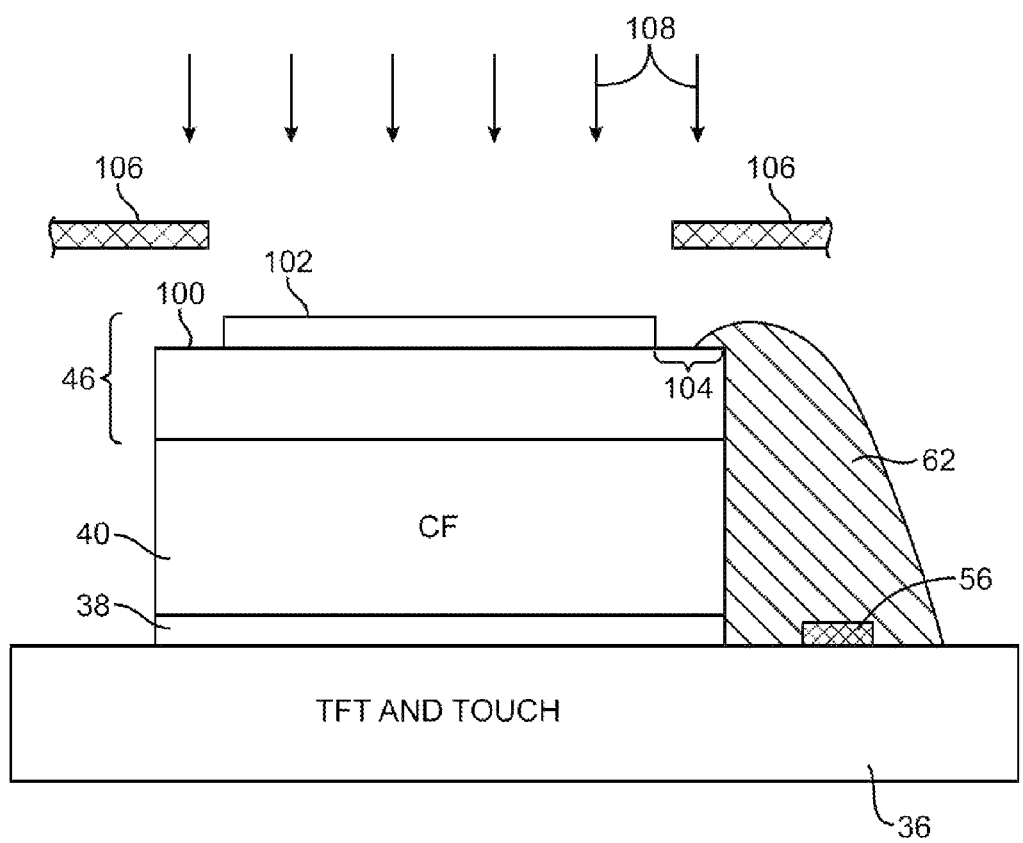
FIG. 19 is a cross-sectional side view of layers in an illustrative display showing how a protective layer may be deposited on a conductive layer through a shadow mask to form a protected shielding layer with exposed portions for grounding to a ground contact in accordance with an embodiment of the present invention.

As shown in FIG. 19, shielding layer 46 may be formed from conductive layer 100 and protective layer 102. Conductive layer 100 may be formed from a metal oxide (e.g., antimony oxide, tin oxide, zinc oxides, or other metal oxides) or other material for which it is desired to provide environmental protection. The resistivity of conductive layer 100 may be, for example, between 10 M-ohm/square and 10 G-ohm/square. In the example of FIG. 19, layer 100 has been formed on color filter layer 40, but this is merely illustrative. Layer 100 may be formed at any suitable location within the stack of layers in display 14.

Protective layer 102 may be formed on top of conductive layer 100 to seal layer 100 from the environment. This may improve the stability of shielding layer 46. Layer 102 may be formed from silicon oxide, silicon nitride, silicon oxynitrides, or other suitable materials. The material of layer 102 may be insulating. To ensure that conductive structure 62 is able to form an electrical connection with conductive layer 100, layer 102 may be deposited in direction 108 by sputtering through shadow mask 106. Shadow mask 106 will block layer 102 from region 104, thereby allowing conductive structure 62 to form an electrical connection between layer 100 and ground contact 56.

The foregoing is merely illustrative of the principles of this invention and various modifications can be made by those skilled in the art without departing from the scope and spirit of the invention. The foregoing embodiments may be implemented individually or in any combination.

What is claimed is:

1. A display, comprising:
   an upper polarizer;
   a lower polarizer;
   a liquid crystal layer interposed between the upper polarizer and the lower polarizer;
   a touch sensor array below the liquid crystal layer;
   a thin-film-transistor substrate, wherein the touch sensor array is formed on the thin-film-transistor substrate;
   an electric field shielding layer above the liquid crystal layer;
   an additional electric field shielding layer above the liquid crystal layer, wherein the upper polarizer is interposed between the electric field shielding layer and the additional electric field shielding layer, and wherein the electric field shielding layer and the additional electric field shielding layer are electrically coupled to a ground contact on the thin-film-transistor substrate; and
   a dot of conductive paste that electrically couples the additional electric field shield layer to the ground contact on the thin-film transistor substrate.

2. The display defined in claim 1 further comprising a switch that is electrically coupled between the electric field shielding layer and the ground contact.

3. The display defined in claim 1 further comprising a capacitive touch sensor electrode array below the liquid crystal layer.

4. The display defined in claim 3 wherein the electric field shielding layer has a resistivity of between 10 M-ohm/square and 10 G-ohm/square.

5. The display defined in claim 1 wherein the electric field shielding layer comprises a conductive layer with openings that increase resistivity for the conductive layer.

6. The display defined in claim 5, wherein the electric field shielding layer further comprises an insulating coating that protects the conductive layer.

7. The display defined in claim 6, wherein the conductive material comprises a nanomaterial.

8. The display defined in claim 6, wherein the insulating coating comprises a polymer resin.

9. The display defined in claim 5, wherein the conductive layer comprises carbon nanotubes.

10. The display defined in claim 5, wherein the conductive layer comprises conductive adhesive.

11. The display defined in claim 5, wherein the conductive layer comprises a conductive doped surface region of a dielectric substrate.

12. The display defined in claim 5, wherein the conductive layer comprises a conductive layer in an antistatic polarizer layer.

13. The display defined in claim 5, wherein the conductive layer comprises a spray-coated layer.

14. The display defined in claim 1 further comprising:
    additional conductive paste electrically connected between the electric field shielding layer and a conductive structure.

15. A display, comprising:
    an upper polarizer;
    a lower polarizer;
    a liquid crystal layer interposed between the upper polarizer and the lower polarizer;
    a touch sensor array below the liquid crystal layer;
    a thin-film-transistor substrate, wherein the touch sensor array is formed on the thin-film transistor substrate;
    an electric field shielding layer above the liquid crystal layer, wherein the electric field shielding layer comprises a conductive polymer; and
    a conductive paste electrically coupled between the electric field shielding layer and a ground terminal on the thin-film-transistor substrate, wherein the conductive paste comprises a dot of metal paint located at a corner of the electric field shielding layer.

16. The display defined in claim 15 further comprising an additional transparent electric field shielding layer above the liquid crystal layer.

17. The display defined in claim 16, wherein the electric field shielding layer is located above the upper polarizer and wherein the additional transparent electric field shielding layer is located below the upper polarizer.

18. The display defined in claim 15 further comprising a capacitive touch sensor electrode array below the liquid crystal layer.

19. The display defined in claim 15 wherein the electric field shielding layer has a resistivity of between 10 M-ohm/square and 10 G-ohm/square.

20. A display, comprising:
    an upper polarizer;
    a lower polarizer;

a liquid crystal layer interposed between the upper polarizer and the lower polarizer;
a touch sensor array below the liquid crystal layer;
an electric field shielding layer above the liquid crystal layer, wherein the electric field shielding layer comprises a conductive polymer; and
a switch that is electrically connected between the electric field shielding layer and a ground contact.

21. The display defined in claim 20 further comprising a thin-film-transistor substrate, wherein the touch sensor array is formed on the thin-film-transistor substrate and wherein the ground contact is located on the thin-film-transistor substrate.

22. The display defined in claim 21 further comprising a conductive paste electrically coupled between the electric field shielding layer and the ground contact on the thin-film-transistor substrate.

* * * * *